(12) United States Patent
Saxena et al.

(10) Patent No.: US 7,897,529 B2
(45) Date of Patent: Mar. 1, 2011

(54) SUBSTRATE FOR CARRYING CATALYTIC PARTICLES

(75) Inventors: Abhishek D. Saxena, Somersworth, NH (US); Paul N. Segit, Dover, NH (US); Stephen E. Gross, Dover, NH (US)

(73) Assignee: Lydall, Inc., Manchester, CT (US)

( * ) Notice: Subject to any disclaimer, the term of this patent is extended or adjusted under 35 U.S.C. 154(b) by 220 days.

(21) Appl. No.: 12/076,758

(22) Filed: Mar. 21, 2008

(65) Prior Publication Data

US 2008/0268232 A1 Oct. 30, 2008

Related U.S. Application Data

(60) Provisional application No. 60/896,573, filed on Mar. 23, 2007.

(51) Int. Cl.
*D04H 1/00* (2006.01)
*D04H 13/00* (2006.01)
*D04H 3/00* (2006.01)

(52) U.S. Cl. ................ 442/414; 442/340; 442/343; 442/348; 442/415; 442/417; 428/325; 156/62.4

(58) Field of Classification Search ............... 442/414, 442/415, 417, 340, 343, 348, 410; 428/325
See application file for complete search history.

(56) References Cited

U.S. PATENT DOCUMENTS

| | | | |
|---|---|---|---|
| 5,192,473 A | 3/1993 | Hruska et al. | |
| 5,198,007 A | 3/1993 | Moyer et al. | |
| 5,250,094 A | 10/1993 | Chung et al. | |
| 5,380,580 A * | 1/1995 | Rogers et al. | 428/219 |
| 5,800,706 A | 9/1998 | Fischer | |
| 6,099,965 A | 8/2000 | Tennent et al. | |
| 6,155,432 A | 12/2000 | Wilson et al. | |

(Continued)

FOREIGN PATENT DOCUMENTS

EP 1 652 573 A 5/2006

(Continued)

OTHER PUBLICATIONS

Armitage et al., "Quasi-Langmuir-Blodgett thin film deposition of carbon nanotubes", J. Appl.Phys., vol. 95, No. 6, Mar. 15, 2004, pp. 3228-3230.

(Continued)

*Primary Examiner*—Norca L Torres-Velazquez

(57) ABSTRACT

There is provided a substrate (1) capable of carrying uniformly dispersed, finely divided, particulate, solid particles, e.g., catalyst particles (10) and sustaining temperatures in excess of 1200 degrees F. The substrate comprises a top layer (2) for containing the particles (10) and composed of quartz fibers (4) with an average diameter of between about 0.1 and 4 microns and about 0 to 13% of microglass fibers having a softening point of about 1000 degrees F. A support layer (3) is composed of the fibers of the top layer and, in addition, bulk refractory, e.g., ceramic, fibers (6) having and average diameter of about 1 to 4 microns and 0 to 50% of chopped e-glass fiber (7). A method for producing the substrate is provided that includes wet laying the top and bottom layers in spaced apart times so that the juncture (8) between the two layers has intermingled fibers whereby the consolidated layers are not easily separated.

17 Claims, 1 Drawing Sheet

U.S. PATENT DOCUMENTS

| | | |
|---|---|---|
| 6,264,045 B1 | 7/2001 | Wilson et al. |
| 6,361,861 B2 | 3/2002 | Gao et al. |
| 6,390,304 B1 | 5/2002 | Wilson et al. |
| 6,432,866 B1 | 8/2002 | Tennent et al. |
| 6,440,610 B1 | 8/2002 | Sheem et al. |
| 6,495,258 B1 | 12/2002 | Chen et al. |
| 6,713,519 B2 | 3/2004 | Wang et al. |
| 6,755,956 B2 | 6/2004 | Lee et al. |
| 6,790,425 B1 | 9/2004 | Smalley et al. |
| 6,824,689 B2 | 11/2004 | Wang et al. |
| 6,863,942 B2 | 3/2005 | Ren et al. |
| 6,921,575 B2 | 7/2005 | Horiuchi et al. |
| 6,949,216 B2 | 9/2005 | Brice et al. |
| 6,960,389 B2 | 11/2005 | Tennent et al. |
| 6,986,876 B2 | 1/2006 | Smalley et al. |
| 7,008,969 B2 | 3/2006 | Wang et al. |
| 7,011,760 B2 | 3/2006 | Wang et al. |
| 7,011,771 B2 | 3/2006 | Gao et al. |
| 7,014,681 B2 | 3/2006 | Noack et al. |
| 7,056,479 B2 | 6/2006 | Dodelet et al. |
| 7,074,260 B2 | 7/2006 | Lee et al. |
| 7,077,891 B2 | 7/2006 | Jaffe et al. |
| 7,094,679 B1 | 8/2006 | Li et al. |
| 7,157,068 B2 | 1/2007 | Li et al. |
| 7,169,374 B2 | 1/2007 | Siochi et al. |
| 7,189,430 B2 | 3/2007 | Ajayan et al. |
| 7,211,320 B1 | 5/2007 | Cooper et al. |
| 7,217,404 B2 | 5/2007 | Ajayan et al. |
| 7,247,670 B2 | 7/2007 | Malenfant et al. |
| 7,288,576 B2 | 10/2007 | Wang et al. |
| 7,291,319 B2 | 11/2007 | Liu et al. |
| 7,323,146 B2 | 1/2008 | Kim et al. |
| 7,351,444 B2 | 4/2008 | Wang et al. |
| 7,419,601 B2 | 9/2008 | Cooper et al. |
| 7,435,476 B2 | 10/2008 | Viswanathan et al. |
| 7,459,013 B2 | 12/2008 | Holmes et al. |
| 7,459,121 B2 | 12/2008 | Liang et al. |
| 7,473,411 B2 | 1/2009 | Ajayan et al. |
| 7,485,024 B2 | 2/2009 | Pan et al. |
| 7,537,682 B2 | 5/2009 | Dailly et al. |
| 7,615,204 B2 | 11/2009 | Ajayan et al. |
| 2002/0132495 A1 | 9/2002 | Siegel et al. |
| 2002/0160111 A1 | 10/2002 | Sun et al. |
| 2003/0153965 A1 | 8/2003 | Supronowicz et al. |
| 2003/0161950 A1 | 8/2003 | Ajayan et al. |
| 2004/0036403 A1 | 2/2004 | Ono et al. |
| 2004/0182600 A1 | 9/2004 | Kawabata et al. |
| 2004/0186459 A1 | 9/2004 | Shur et al. |
| 2004/0247808 A1 | 12/2004 | Cooper et al. |
| 2004/0253371 A1* | 12/2004 | Janney ............ 427/180 |
| 2005/0127030 A1 | 6/2005 | Watanabe et al. |
| 2005/0170089 A1 | 8/2005 | Lashmore et al. |
| 2006/0027499 A1 | 2/2006 | Ajayan et al. |
| 2006/0073089 A1 | 4/2006 | Ajayan et al. |
| 2006/0093740 A1 | 5/2006 | Park et al. |
| 2006/0160200 A1 | 7/2006 | Rathenow et al. |
| 2006/0172179 A1 | 8/2006 | Gu et al. |
| 2006/0177369 A1 | 8/2006 | Miao |
| 2006/0269670 A1 | 11/2006 | Lashmore et al. |
| 2007/0104867 A1 | 5/2007 | Haba |
| 2007/0148963 A1 | 6/2007 | Chan et al. |
| 2007/0189953 A1 | 8/2007 | Bai et al. |
| 2007/0253890 A1 | 11/2007 | Nakayama et al. |
| 2008/0001284 A1 | 1/2008 | Yuen et al. |
| 2008/0041791 A1 | 2/2008 | Cooper et al. |
| 2008/0061477 A1 | 3/2008 | Capizzo |
| 2008/0095694 A1 | 4/2008 | Nakayama et al. |
| 2008/0160311 A1 | 7/2008 | Tani et al. |
| 2008/0170982 A1 | 7/2008 | Zhang et al. |
| 2008/0286564 A1 | 11/2008 | Tsotsis |
| 2009/0061217 A1 | 3/2009 | Silva et al. |
| 2009/0068545 A1 | 3/2009 | Kim et al. |
| 2009/0075157 A1 | 3/2009 | Pak et al. |

FOREIGN PATENT DOCUMENTS

| | | |
|---|---|---|
| WO | WO 97/32571 A1 | 9/1997 |
| WO | WO 99/65821 A1 | 12/1999 |
| WO | WO 2007/149109 A2 | 12/2007 |

OTHER PUBLICATIONS

Bakajin et al., "Carbon Nanotube Based Microfluidic Elements for Filtration and Concentration", Lawrence Livermore National Laboratory, http://www.llnl.gov/tid/library.html, Preprint UCRL-JC-153778, Jun. 25, 2003, 6 pages.

Casavant et al., "Neat macroscopic membranes of aligned carbon nanotubes", J. Appl. Phys., vol. 93, No. 4, Feb. 15, 2003, pp. 2153-2156.

Loftus, "Carbon nanotube bucky paper scaffold", NASA, Technology Opportunity, Medical Device Technology, 2 pages, Jan. 6, 2003.

Miller et al., "Carbon nanotubes: electroosmotic flow control in membranes", Dekker Encyclopedia of Nanoscience and Nanotechnology, Apr. 13, 2004, pp. 519-528.

NanoTechLabs, "Nanotubes as High Efficiency Filters", Apr. 27, 2005, Winston-Salem, NC, 1 page.

Neimark et al., "Hierarchical pore structure & wetting properties of single-wall carbon nanotube fibers", Nano Letters, vol. 3, No. 3, 2003, pp. 419-423.

Srivastava et al., "Carbon nanotube filters", Nature Materials, vol. 3, Sep. 2004, pp. 610-614.

Viswanathan et al., "High Efficiency Fine Particulate Filtration using Carbon Nanotube Coatings", Advanced Materials, vol. 16, No. 22, Nov. 18, 2004, pp. 2045-2049.

Zhang et al., "Strong, transparent, multifunctional, carbon nanotube sheets", Science, vol. 309, Aug. 19, 2005, pp. 1215-1219.

* cited by examiner

SUBSTRATE FOR CARRYING CATALYTIC PARTICLES

This Non-provisional application claims priority under 35 U.S.C. §119(e) on U.S. Provisional Application No(s). 60/896,573 filed on Mar. 23, 2008, the entire contents of which are hereby incorporated by reference.

The present invention relates, in a preferred embodiment, to a substrate capable of carrying uniformly dispersed, finely divided, particularly, solid catalyst and sustaining temperatures in excess of 1200° F. More particularly, it is directed to such substrates that can carry catalytic particles that are so finely divided that the catalytic particles can cause a catalytic reaction at very close but spaced apart loci on the substrate. As a notable example thereof, the substrate can carry finely divided particles suitable for catalyzing a chemical vapor deposition of carbon nano fibers in such spaced apart relationship and with such close proximity that filters made thereof are capable of filtering minute particles, for example, virus particles.

BACKGROUND OF THE INVENTION

Catalytic substrates are well known in the art and vary from solids to liquids and, more particularly, to fabric type substrates. The invention, in preferred embodiments, is directed to this latter type of catalytic substrate, and in a further preferred embodiment, to such catalytic substrates that can be used for carrying out catalytic chemical vapor deposition at high temperatures, especially temperatures in excess of 1200° F. At such temperatures, most catalytic substrates become unsuitable. Some such substrates will simply burn or melt, while other such substrates will lose the necessary physical properties required to function as a catalytic substrate. The present invention provides such catalytic substrates that can function at temperatures of 1200° F. and greater, while maintaining sufficient physical properties to function as a catalytic substrate. Therefore, the present substrate is capable of carrying out chemical reactions at elevated temperatures, especially chemical vapor depositions temperatures, such as that in producing nano tubes, especially carbon nano tubes.

High temperatures substrates that are formed of high temperature particulate ceramics are capable of sustaining such chemical vapor deposition reaction temperatures, but the reaction products are spaced at relatively far apart positions, because of the relatively large particulate size of the catalytic substrate, e.g. 100 mesh particles and the like.

Therefore, in order to provide very closely spaced loci for such catalytic reactions, the general approach in the art is to provide a porous substrate, generally a nonwoven, fibrous substrate, in which finely divided particulate solid catalyst can be dispersed. With such dispersion of finely divided particulate material, the loci of the catalytic reaction can be very closely spaced apart. Thus, the distance between the products of the catalytic reaction can be quite small, and filters, for example, made of such substrates can filter very small particles. This approach is quite satisfactory for many catalytic reactions, but some catalytic reactions, such as chemical vapor depositions for forming carbon nano tubes, require high temperatures, generally in excess of 1200° F. Accordingly, the substrate must be capable of sustaining those temperatures in order to carry out the catalytic reaction.

It is known that single layered substrates of carbon or ceramics in conventional form, e.g. fabrics, felts, cloths, tows, et cetera, may be used as substrates for catalyzed, high temperature vapor deposition growth of "whiskers" of materials such as carbon, silicon carbide and titanium nitride thereon for improving filters made of those conventional forms, such as disclosed in U.S. Pat. No. 6,390,304. However, such single layered conventional substrates are merely treated with a solution of a precursor of the catalyst that is reduced to catalytic form. As such, there is no controlled deposition of the catalyst particles, and the "whiskers" are generally randomly displayed with greatly varying distances therebetween.

Thus, the art simply has not provided such porous substrates, made of nonwoven fibrous materials, that are capable of carrying uniformly dispersed, finely divided, particular solid catalyst and which can also sustain temperatures in excess of 1200° F. Of course, substrates of that nature would be of considerable value to the art.

SUMMARY OF THE INVENTION

The present invention is based on several primary discoveries and several subsidiary discoveries.

First of all, it was found that in order to provide a suitable substrate for such high temperature catalytic reactions, it was not practical for the substrate to be a single nonwoven layer of material. If a single layer of nonwoven material is constructed such that it has the ability to uniformly carry and disperse the finely divided, particulate, solid catalyst, then that material, according to present experimentations, could not successfully retain the particles and also sustain temperatures in excess 1200° F. while retaining the required physical properties. It is necessary for the substrate to sustain that temperature in order to function in the reaction and subsequently function as a practical product, e.g. a filter. Thus, it was discovered that a practical substrate of that nature must contain at least two layers. One of those layers is designed for carrying and retaining the catalyst particles, and the other layer is designed as a support for the catalyst containing layer, which support layer provides the required physical properties to the combination of the two layers when functioning in excess of 1200° F., and thereafter in practical applications, e.g. as a filter.

As a second discovery, it was found that the top catalyst-containing layer should be composed of staple quartz fibers with very small diameters, and may have microglass fibers having a softening point of about 1000° F. It was found that the staple quartz fibers could sustain temperatures in excess of 1200° F., but could also be disposed, by certain processes described hereinafter, in such an array that the fibers can carry and retain the uniformly dispersed, finely divided, particulate, solid catalyst therein, with that disposition placing the catalyst particles in very close proximity to each other, but at controlled spaced apart locations. This is an important finding.

As another discovery, it was found that while the staple quartz fibers could form a layer which could uniformly disperse the catalytic particles, the quartz fibers may not sufficiently intertwine as to form a layer with sufficient physical properties for carrying and retaining the catalytic particles during a chemical vapor disposition and subsequent use as a product, e.g. filter. Therefore, it was found that, for some top layer configurations, the staple quartz fibers may, but not necessarily, have a heat resistant binder therein.

As another discovery, it was found that the heat resistant binder is quite satisfactorily microglass fibers having a softening point of about 1000° F. Thus, when the top layer is subjected to temperatures in excess of 1200° F., the microglass fibers will soften and adhere the staple quartz fibers together, thus, providing sufficient physical properties to the top layer of quartz fibers that the top layer, in almost any configuration, can function in the above described manners.

As another feature, it was found that to perform that binding function, the microglass fibers, when used, must be quite small, i.e., have average diameters of between about 0.1 and 4 microns. With the microglass fibers in this range, the fibers can bridge across the staple quartz fibers and form a fairly strong top layer for containing the catalyst.

As another discovery, it was found that the microglass fibers in the top layer are contained therein in a relatively critical amount. If the microglass fibers are in an amount of less than about 1% by weight, then there is not sufficient binding of the quartz fibers to provide the required physical properties of the top layer in all configurations. On the other hand, if more than about 12% of the microglass fibers are in the top layer, upon cooling, the top layer becomes too brittle and therefore does not have the required physical properties.

The described top layer will controllably, uniformly disperse and firmly hold the finely divided, particulate, solid catalyst, but that top layer, in and of itself, does not have sufficient physical properties for subsequent use in chemical vapor deposition and in a product, e.g. a filter. Thus, as noted above, a further important feature of the invention is that of combining the top layer with a support bottom layer that provides greater physical properties to the combination of the two layers. In this regard, and as another major feature of the invention, it was found that the bottom layer should be composed of the same fibers as the fibers of the top layer, described above, but, in addition, must also contain bulk refractory fibers having an average diameter of about 1 to 4 microns. The bulk refractory fibers, formed by a bulk forming process, e.g. a blowing process, provide greatly interlocked, high temperature resistant fibers that can form a very strong support bottom layer. However, to provide even greater strength to that bottom support layer, so that the combined dual layer substrate will have very substantial physical properties during the catalytic vapor depositions reaction and during subsequent use as a product, e.g. a filter, it was found that the support bottom layer must also have therein the microglass fibers, described above, in amounts of about 1% to 12%, especially about 3% to 8%. The microglass fibers function, as described above, as a binder.

Further, since the refractory fibers are expensive, the bottom layer may contain chopped e-glass fibers. These fibers are high temperature resistant glass fibers, having controlled, chopped lengths. These fibers can intertwine in among the bulk refractory fibers, and bulk-up the bottom layer to give desired configurations of the bottom layer but at reduced costs.

With these discoveries, a very suitable substrate capable of carrying and retaining controlled, uniformly dispersed, finely divided, particulate, solid catalyst, which substrate will sustain temperatures in excess of 1200° F., is provided. However, as subsidiary features, it was found that the substrate is much improved when the quartz fibers are substantially melt blown fibers, of amorphous silica, with melting temperatures of about 3000° F.

As a further subsidiary feature, it was found that preferably the quartz fibers have an average diameter of between about 0.5 and 2 microns.

As another subsidiary feature it was found that the microglass fibers should have an average diameter of about 0.1 to 1.5 microns.

DETAILED DESCRIPTION OF THE INVENTION

Figure 1:
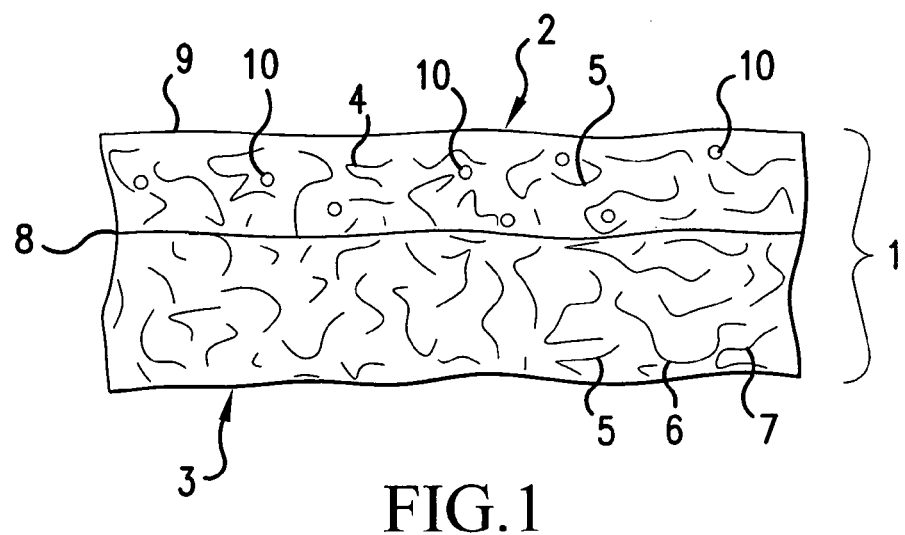
FIG. 1 is a highly idealized, diagrammatic illustration of a side view of the substrate of the present invention.

As best can be seen from FIG. 1, the substrate generally 1 has a top layer generally 2 and a support bottom layer generally 3. The top layer 2, which will provide support for the catalyst, is composed of staple quartz fibers 4 with an average diameter between 0.1 and 4 microns, and, optionally-but usually, about 1 to 12%, e.g. 3 to 8%, of microglass fibers 5, having a softening point of about 1000° F.

The bottom support layer 3 is composed of the fibers of the top layer and, in addition, bulk refractory fibers 6 having an average diameter of about 1 to 4 microns and, optionally, chopped e-glass fibers 7, as well as the microglass fibers 5.

Top layer 2 joins bottom layer 3 at a juncture or interface 8 where the fibers of top layer 2 and the fibers of bottom layer 3 intermingle, to a certain extent, as described more fully hereinafter.

Most preferable, the quartz fibers are substantially melt blown fibers with a high melting temperature. Of course, the melt blowing process is well known to the art and need not be described herein. While these fibers are referred to as "quartz fibers" in the art, they are not, in fact, pure natural quartz, but manufactured silica fibers, and in this case, preferably, amorphous silica fibers, with a high melting temperature. The melting temperature of the particularly preferred quartz fibers is about 3000° F., e.g. from about 2500 to 3500° F. This provides a wide measure of safety for the substrate because of these very high temperature quartz fibers, but the quartz fibers could be of a lower melting temperature e.g. somewhere of about 1500° F. or greater. This will, however, lessen the strength of the resulting substrate and is not preferred.

While the quartz fibers can vary in diameter, and will vary in diameter according to the particular bulk forming process, i.e. the particular melt blowing or spinning process, it is preferred that the quartz fibers have an average diameter between about 0.1 and 4 microns, especially between 0.5 and 2 microns. With such very small diameter fibers, the top layer will be formed into a non-woven layer, as described more fully hereinafter, with quite small pores. These quite small pores will allow and promote uniform dispersal of finely divided, particulate solids therein. Thus, for a catalytic reaction, e.g. the formation of nano tubes, these small fibers provide well dispersed but controlled, closely adjacent catalytic particles. That is, the catalytic particles can be from about an average of 0.5 to 2 microns apart, although they could be as much as about an average of 7 or 8 microns apart and for some applications, other than nano tubes, they could be much further apart, e.g. up to an average of about 15 or 20 microns apart. In such case, quartz fibers of greater diameter could be used. It has been found that the pores formed by such quartz fibers are so small and uniform that substantially only one catalyst particle will reside in one pore and the distances between the particles can be controlled. This is quite important to forming well-spaced apart nano tubes.

As noted above, while the quartz fibers provide the matrix for a very closely spacing apart the catalytic particles, the quartz fibers may not form a layer of sufficient mechanical properties for the catalytic reaction and subsequent use. Therefore, that top layer may be strengthened, and, as noted above, it has been found that the top layer can be very readily strengthened by the use of glass microfibers in that top layer. Also, as briefly noted above, when subjected to temperatures of about 1000° F. or higher, the glass microfibers soften and begin to adhere the quartz fibers to one another. This forms a much stronger network of the quartz fibers and provides sufficient properties to the top layer for the above-described purposes in almost any configuration of the substrate. However, for this function to take place, these glass microfibers must also be of very small diameter. Otherwise, they could cause the catalytic particles to be further spaced apart, or not uniformly spaced apart, than desired, as explained above. Further, the microglass fibers should be of very small diameters so that the softening and adhering of the quartz fiber will readily take place at temperatures near or above 1000° F., even for short periods of time. Accordingly, it is much preferred that the microglass fibers have an average diameter of about 0.1 to 5 microns, although fibers greater than this diameter could be used for other purposes, e.g. up to about 10 or 15 microns. These diameters are readily obtained by the conventional melt blowing process for producing the microglass fibers.

As noted above, the support bottom layer has the same fibers as the top layer but in addition has the bulk refractory fibers and, optionally, chopped e-glass fibers. The bottom layer is not intended to carry any catalyst and, as described below, substantial efforts are provided to avoid catalyst particles from penetrating into the support bottom layer. The bulk refractory fibers, as with all bulk fibers, are made by a melt blowing or spinning and vary considerably in length, depending upon the particular melt blowing or spinning process, but are readily controllable in the general diameter thereof. Since the purpose of the bulk refractory fibers is to provide a strong support bottom layer, substantial intertwining of the fibers is most desired. To achieve that great degree of intertwining, in a wet laying process, as described below, the average diameter of the bulk refractory fibers should be between about 1 and 5 microns, especially 1 to 4 microns, although for other purposes, as mentioned below, the diameters could be up to about 15 or 20 microns. While a wide variety of refractory fibers may be used, it is particularly desirable to use ceramic fibers, especially alumina silica fibers, since these fibers provide high strength, are high temperature resistant and intertwine well. Particularly, this is true when the ceramic fibers have an average diameter of about 1 to 4 microns and an average length of about 0.1 to 0.5 inches The chopped e-glass fibers, being chopped fibers, have more specific lengths, and are useful for intertwining in and among the refractory fibers to bulk-up the refractory fibers and contribute to a strong support bottom layer, but at a reduced cost.

While it is only necessary to have one top layer to carry the catalyst and one support bottom layer, to provide the support therefore, multiple top layers and multiple bottom layers could be used. This, however, complicates the process of manufacturing the substrate and for this reason it is preferred that there is not more than one top layer and one bottom layer in the substrate.

Both the bottom layer and top layer as produced, maybe somewhat weak during processing, especially in the early stages of production and especially in the drying stages. For this reason it is often useful to include in either the top layer or the bottom layer or both of these layers a binder so that the layers are more tightly bound together, especially during processing. However, when a binder is used it is preferred that the binder be burned off so as to not contaminate the substrate during catalytic activity. For this reason a relatively fugitive binder, such as an acrylic binder, is much preferred. However, the binder may be chosen from any of the conventional polymeric latex binders used in the paper arts, such as olefins and vinyls.

In order to restrain the particles of catalyst in the top layer, both layers should have very small mean pore sizes, particularly mean pore sizes between about 0.5 and 5 microns. This will prevent the small catalytic particles from substantially penetrating from the top layer to the bottom layer, during loading of the catalytic particles onto the substrate. This is particularly true when the mean pore size of the layers is about 1 micron. Further, in this regard, it much preferred that the largest continuous pore size (from one side of the substrate to the other) is about 25 microns. This will insure that very little of the catalytic particles penetrate from the top layer to the bottom layer.

As noted above, the substrate must have certain physical properties in order to be processed, loaded with the catalyst particles, and heated to temperatures suitable for chemical vapor deposition reactions, especially temperatures in excess of 1200° F. for producing carbon nano tubes. To this end, the substrate should have a longitudinal tensile strength (in the machine direction as being processed and is explained below) of at least 750 grams per inch and tensiles up to 5000 are quite good. Somewhat similarly, longitudinal stiffness of the substrate should be at least 500 milligrams and up to 1500 milligrams, after the substrate is subjected to temperature at 1200° F. for 2 hours.

In addition, since the substrate is very useful for catalytic purposes and especially chemical vapor deposition reactions, there should be very few organic impurities therein. Accordingly, the substrate should have a loss on ignition in a muffle furnace at 1000° F. of no more than 15% and typically about 7% or less.

The percentages of the various fibers in the two layers can vary considerably, but it is preferred that the percent by weight of the refractory fibers is about 10 to 40%, the percentage by weight of the e-glass fibers is about 15 to 50% by weight, the percentage of the quartz fibers is about 15 to 50% by weight, and the percentage by weight of the microglass fibers in each layer is about 1 to 15%.

Figure 2:
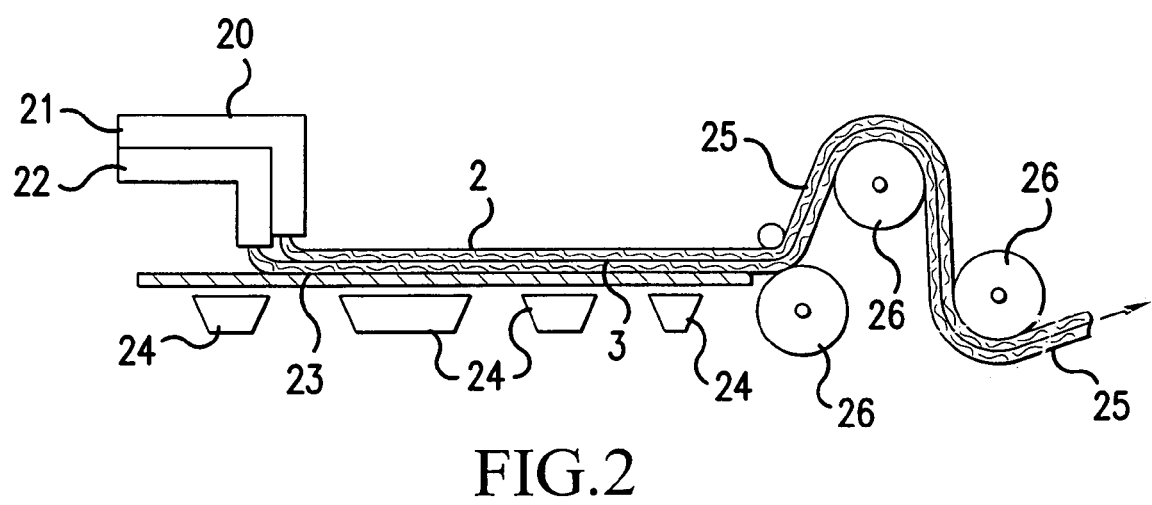
FIG. 2 is a highly idealized, diagrammatic illustration of the process for producing the substrate of the present invention.

The method of producing the substrate is diagrammatically illustrated in FIG. 2, which is a highly idealized side view of a wet laying machine. As shown in FIG. 2, the top layer 2 and the bottom layer 3 are laid from a dual head box 20 having a first flow path 21 and a second flow path 22 for depositing top layer 2 and bottom layer 3, respectively, on a formacious traveling device, such as a screen, 23, fitted with suction devices 24. Thus, the method comprises wet laying the fibers of the bottom layer 3 onto the formacious screen 23 to form a wet bottom layer 3, and then wet laying the fibers of the top layer 2 onto the wet bottom layer 3 at a time in the forming of the bottom layer 3 such that the fibers of the top layer 3 can partially intermingle (intertwine) with the fibers of the bottom layer 3, as shown in FIG. 1 by the wavy line at juncture 8. As can be seen from FIG. 2, the bottom layer is first laid from the second flow path 22 onto the formaceous screen device 23, and, thereafter, after an appropriate delayed time, e.g. 1 second or less, the top layer 2 is laid from the first flow path 21 onto the top of the bottom layer. That delay in time is sufficient that the bottom layer 3 begins to form by action of being dewatered by suction devices 24. But before that bottom layer is consolidated, the fibers of the top layer 2 are laid thereon. Since the suction devices 24 will also pull water from the top layer 2 some of the fibers of the top layer will penetrate into the juncture 8 (see FIG. 1) of the substrate and therefore bind the two layers together. Thus, the top layer 2 is laid onto the wet bottom layer 3 at a time of the forming of the bottom layer 3 such as the fibers of the top layer 2 can intermingle and intertwine with the fibers of the bottom layer 3 at juncture 8 to form a consolidated wet substrate 25. The juncture 8 is, therefore, quite tight and helps in preventing catalyst particle from penetrating from the top layer into the bottom layer, as explained more fully below. That consolidated wet substrate 25 is dewatered and dried sufficiently to form the substrate 1 (see FIG. 1) in such a manner that the top and bottom layers 2 and 3 are not easily separatable one from the other. This is achieved by passing the consolidated wet substrate 25 over a series of drying cans 26 where the consolidated substrate is dried to a low moisture content, e.g. about 10% or less and so as to have the properties described above. While not shown in the drawings, a binder may be sprayed onto top layer 2 by a plurality of nozzles spaced across the width of the layers and pull through the layers by a conventional felt vacuum box. The binder may be useful in some applications for strengthening the layers during processing, particularly during drying. The flows through first flow path 21 and second flow path 22 of the top layer 2 and bottom layer 3 should be such that the dried consolidated substrate 25 has a weight of about 5 to 40 lbs per 1000 sq. ft.

To form the catalyst into the substrate, the catalyst is applied to a top portion 9 (see FIG. 1) in a dispersed form of finely divided particulate solid catalyst, e.g. by spraying the catalyst dispersed in a liquid either during or after forming the consolidated substrate 25. Alternatively, the catalyst can be formed in situ in top layer 2 by dispersing a precursor of the catalyst in the top layer and then supplying to that precursor a further component to cause the precursor to form catalytic particles in the top layer. Or catalysis particles may be dispersed in the head box so as to flow with the top layer from flow path 21. This latter is the preferred embodiment. In any event, the catalyst particles 10 should be very uniformly dispersed in top layer 2 and by reason of the pore sizes, as described above, little or none of the catalyst particles will penetrate into bottom layer 3.

The thickness of top layer 2 can vary as desired, but with a very thin top layer, the chemical vapor disposition catalytic reaction, e.g. in forming nano tubes, can take place such that the nano tubes essentially generate from the top portion 9 of top layer 2 and project upwardly therefrom. Since the catalyst particles can be spaced apart, by the present fiber arrangement of the present invention, by a mere few microns or less, the nano tubes can be generated at distances apart of, likewise, a few microns or less. That results in the pore sizes of the generated nano tubes, in filter form, of likewise being only a few microns or less. Such very low pore size of the generated nano tubes can provide a filter material that will filter exceedingly small particles, even virus particles. However, for other or slightly different purposes, the weight ratio of the top layer to the bottom layer (without catalyst) may vary from 1:20 to 20:1, but more usually 1:10 to 10:1, and especially from 1:3 to 3:1.

The particular catalyst used may be as desired and is not critical to the use of the present substrate. For example, when nano tubes are to be grown using chemical vapor deposition techniques, often the catalyst is an iron compound. However, any desired solid catalyst may be used.

EXAMPLE

In the Example, as well as in the specification and claims, all parts and percentages are by weight unless otherwise stated. The machine used in this Example is a conventional rotoformer set for 25.5 inches dry paper width. The machine has a Machine Chest for laying the bottom layer and a Blend Chest for laying the top layer. Both chests have a 1300 gallons capacity. There are ten dryer cans that are normally operated with internal steam pressures of 40 to 60 psig to provide operating temperatures of up to 300 degrees F. The water extraction suction is usually operated at about 15-20 inches of water vacuum to dewater the slurry when the machine is operated at the usual run speed of about 10 feet per minute.

In this particular Example, a first hydropulper was loaded with 600 gallons of water and 900 ml of sulfuric acid (industrial grade) to lower the pH to about 4.0. This aids in the dispersal of the fibers. Fibers are added until there is a consistency of about 0.138%, which is about 15 lbs in this example, and in this example there were added 20% of ceramic refractory fibers (PG 111), 26% chopped strand DE glass, 47% amorphous silica quartz fibers and 7% Code 100 microglass fibers.

Into a second hydropulper were added 600 gallons of water, 76% quartz fibers, 1% Code 100 microglass fibers and 23% catalyst, as described below, until a consistency of 0.128% was reached, which was about 9.6 lbs. of fibers in this example. No acid is added because it could adversely affect the catalyst, depending on the particular catalyst to be used, and a lower consistency and longer pulping time are used. In this example about 2 minutes of pulping time in used in the first hydropulper and about 5 minutes in the second hydropulper.

The contents of the first hydropulper was dumped into the Machine Chest, along with 600 gallon of dilution water and the contents of the second hydropulper was dumped into the Blend Chest, along with 600 gallons of dilution water.

The catalyst is added to the Blend Chest. The catalyst was prepared by adding commercially available iron compound nano fiber producing catalyst solids to deionized water at a concentration of about 11 grams/liter of water and dispersing the solids by use of an ultrasonic dual-frequency reactor (Advanced Sonics).

The flow rates of the two chests were 38 gallons/minutes and 37 gallons/minute for the Machine Chest and the Blend Chest, respectively. The machine speed was set at 10 feet/minute and the vacuum was set on the water extractors at about between 15 and 20 inches of water.

The bottom layer is first laid from the Machine Chest onto the former screen and with about a 1 second delay, the top layer is laid from the Blend Chest onto the forming bottom layer. This delay causes an intermingling of the fibers at the interface of the two layers and a tightening of the juncture therebetween, as explained above. The water drained from the forming layers was monitored to insure that the catalyst remains in the layers and does not pass through the forming layers. After the layers are formed, an acrylic latex binder (HYCAR-26106) at a 1.77% consistency is sprayed onto the top layer at an average spray rate of about 9.51 gallons/hour/nozzle, with four nozzles equally distanced across the width of the formed dual layered sheet. The sheet is then passed over a conventional felt vacuum box operated at about 8 to 15 inches of water to suck the binder through the sheet and produce a sheet with a moisture content of about 70 to 80% moisture and is then dried on the ten drier can at about 300 degrees F. and at a speed of about 10 feet/minute. The dried sheet is then collected in rolls. The composition of the dried dual layer sheet was about 10% PG 111 ceramic refractory fibers, 13% DE chopped glass strand fibers, 4% Code 100 microglass fibers, 58% quartz fibers, 11% catalysts and 4% binder. The ratio of the weights of the top layer to the bottom layer was about 1:2. The dual layered substrate is so strong that it could be pleated into a conventional pleated filter configuration. A sample of the so produced substrate was placed in an oven heated to 600 degrees C. and a conventional mixture of acetylene and ammonia gases was allowed to flow through the oven. Carbon nano tube growth occurred at the catalyst sites. The growth of the nano tubes is controllable by the concentration of the gases and the time of exposure to the gasses. The total growth of nano tubes was tested by a conventional burn-out method of several samples and it was found that the carbon content was 35 to 40%, which shows excellent results for the invention.

The invention, as described above, is amenable to uses in applications other than as a substrate for catalyst, although that is an important advantage of the invention. Since the top layer is capable of holding and uniformly dispersing solids in the top layer and capable of operating at high temperatures, the dual layer substrate may be used for such diverse purposes as high temperature in depth loading filters, especially for recovering valuable small particles; holding expensive activated particles in the top layer for contact with a reactive stream; holding absorbents/adsorbents for a gas stream treatment, e.g., flu gases; and displaying small electronic particles in a uniform array for microwaves and the like. Thus, the invention is not limited to the use as a nano tube catalyst holding substrate.

What is claimed is:

1. A substrate capable of sustaining temperatures in excess of 1200° F., comprising:
   a top layer composed of quartz fibers with an average diameter of between about 0.1 and 4 microns and about 0 to 15% of microglass fiber based on the total weight of the top layer, the microglass fiber having a softening point of about 1000° F.; and
   a support bottom layer composed of the fibers of the top layer and, in addition, bulk refractory fibers having an average diameter of about 1 to 5 microns and 0 to 50% of chopped e-glass fibers based on the total weight of the support bottom layer.

2. The substrate of claim 1, wherein the quartz fibers are substantially melt blown, amorphous silica fibers with melting temperatures of about 3000° F.

3. The substrate of claim 2, wherein the quartz fibers have an average diameter between about 0.5 and 2 microns.

4. The substrate of claim 1, wherein the microglass fibers have an average diameter of about 0.1 to 1.5 microns.

5. The substrate of claim 1, wherein the refractory fibers are substantially alumina silica fibers.

6. The substrate of claim 5, wherein the refractory fibers have an average diameter of about 1 to 4 microns and average lengths of about 0.1 to 0.5 inches.

7. The substrate of claim 1, wherein one or more of the top layer and bottom layer has a binder therein.

8. The substrate of claim 7, wherein the binder is an acrylic binder.

9. The substrate of claim 1, wherein the bottom layer and the top layer have mean pore sizes of between about 0.5 and 5 microns.

10. The substrate of claim 9, wherein the mean pore size is about 1 micron.

11. The substrate of claim 10, wherein the largest continuous pore size is about 25 microns.

12. The substrate of claim 1, wherein the longitudinal tensile strength of the substrate is at least 750 grams/inch and the longitudinal stiffness of the substrate is at least 500 mg after the substrate is subjected to a temperature of 1200° F. for 2 hours.

13. The substrate of claim 1, wherein the loss on ignition of the substrate in a muffle furnace at about 1000° F. is not more than 15%.

14. The substrate of claim 1, wherein the percents by weight of refractory fibers is 10 to 40%, the percentage by weight of the e-glass fiber is 15-50%, the percentages by weight of the quartz fibers is 15-50%, and the percentage by weight of the microglass fibers is 1-12%.

15. A method for producing the substrate of claim 1, comprising, wet laying the fibers of the bottom layer onto a formaceous screen to form a wet bottom layer, wet laying the fibers of the top layer onto the wet bottom layer at a time of forming the bottom layer that the fibers of the top layer form a consolidated wet substrate where the fibers of the top layer at least partially intermingle with the fibers of the bottom layer and dewatering and drying the consolidated wet substrate sufficiently to form the substrate, wherein the top and bottom layers are not easily separatable.

16. The method of claim 15, wherein the dried substrate has a weight of about 5 to 40 lbs/1000 sq. ft.

17. The substrate of claim 1, wherein the top layer contains uniformly dispersed, finely divided, particulate, solid particles.

* * * * *